March 9, 1965 H. L. NORTH, JR 3,172,259
VARIABLE GEOMETRY CONTROL FOR GAS TURBINE ENGINES
Filed March 2, 1962 2 Sheets-Sheet 1

INVENTOR.
HOWARD L. NORTH JR.
BY
ATTORNEYS

March 9, 1965 H. L. NORTH, JR 3,172,259
VARIABLE GEOMETRY CONTROL FOR GAS TURBINE ENGINES
Filed March 2, 1962 2 Sheets-Sheet 2

INVENTOR.
HOWARD L. NORTH JR.
BY
ATTORNEYS

United States Patent Office 3,172,259
Patented Mar. 9, 1965

3,172,259
VARIABLE GEOMETRY CONTROL FOR GAS
TURBINE ENGINES
Howard L. North, Jr., Stratford, Conn., assignor to
Avco Corporation, Stratford, Conn., a corporation
of Delaware
Filed Mar. 2, 1962, Ser. No. 176,929
11 Claims. (Cl. 60—39.27)

This invention relates to a control system for gas turbine engines in which variable engine geometry is manipulated for different operating conditions, and more particularly to a fuel control system which regulates said geometry to permit reduction of engine acceleration time.

The term "variable engine geometry" as used herein designates various means whereby effective size, adjustment, or relative positioning of the parts of engine components may be manipulated to vary and improve engine performance under changing conditions. For illustration, such variable engine geometry components might comprise one or more of: compressor interstage air bleeds, compressor discharge air bleeds, compressor variable stator blades, variable turbine exhaust nozzle areas, variable angle of turbine stator blades, compressor inlet flow fences or restrictions, turbine by-pass or bleed valves, as well as other well known devices.

In fuel systems for gas turbine engines, the accelerating fuel flow is customarily scheduled to avoid such limits as maximum turbine temperature and a somewhat lower limit imposed by compressor stall. With the aid of variable engine geometry it is possible to increase the limit imposed by compressor stall and to obtain more rapid engine accelerations. However, the geometry position of such devices which permits the fastest accelerations usually results in decreased engine power and efficiency at steady state. Most of the existing systems for controlling such geometry position the components to permit fast acceleration at low engine power levels where the efficiency and power losses are tolerable. At high engine power levels the variable geometry components are positioned for highest efficiency and power with the result that the positioning of such components, as at high engine power levels, is therefore not optimum for acceleration.

It is therefore an object of the present invention to provide a control system which positions one or more variable geometry components during acceleration to provide fast acceleration, and position such variable components to obtain high engine power and efficiency in the high engine power range.

It is a further object of the present invention to provide a control system which positions one or more variable geometry components during accelerations as needed to obtain fast acceleration and positions such components during steady operation as needed to obtain high engine power and efficiency.

It is another object to provide different means of control of the variable geometry components for improving engine operation, utilizing the various sensed and regulated engine parameters present and available in typical gas turbine engine fuel controls in conjunction with a hydraulic or pneumatic power amplifier for final positioning of the variable elements of the engine geometry component.

It is another object to provide control of a variable engine geometry component which is compensated for the effects of variations in engine operating conditions, such as compressor inlet air temperature or pressure.

It is a further object to provide control of variable engine geometry components in which the various parameters of engine operation (such as engine rotative speed, engine air temperatures and pressures, as well as fuel flow and other variables) are used to generate motions for actuating such variable geometry components.

It is another object to provide an actuating control for variable engine geometry components which is actuated by a member which is responsive to the deviation of the actual fuel flow to the engine from a programed reference fuel flow.

It is another object to provide remotely actuated positioning means for variable engine geometry.

It is a further object to provide interconnection between the member responsive to deviation of actual fuel flow from a reference fuel flow to actuate variable engine geometry through a fluid pressure actuated connection as distinguished from a mechanical linkage connection.

It is another object to provide a mechanism of the type described with fluid pressure actuated feedback means, using a feedback valve in place of the conventional feedback linkage or other mechanical feedback means, thereby to complete a remotely actuated positioning means with feedback.

Other objects and advantages will become apparent from the following specification considered in connection with the accompanying drawings, in which:

FIGURE 4 is a view substantially on line 4—4 of FIGURE 1 and showing means to compensate for temperature variation of air entering the compressor of engine 10.

Figure 1:
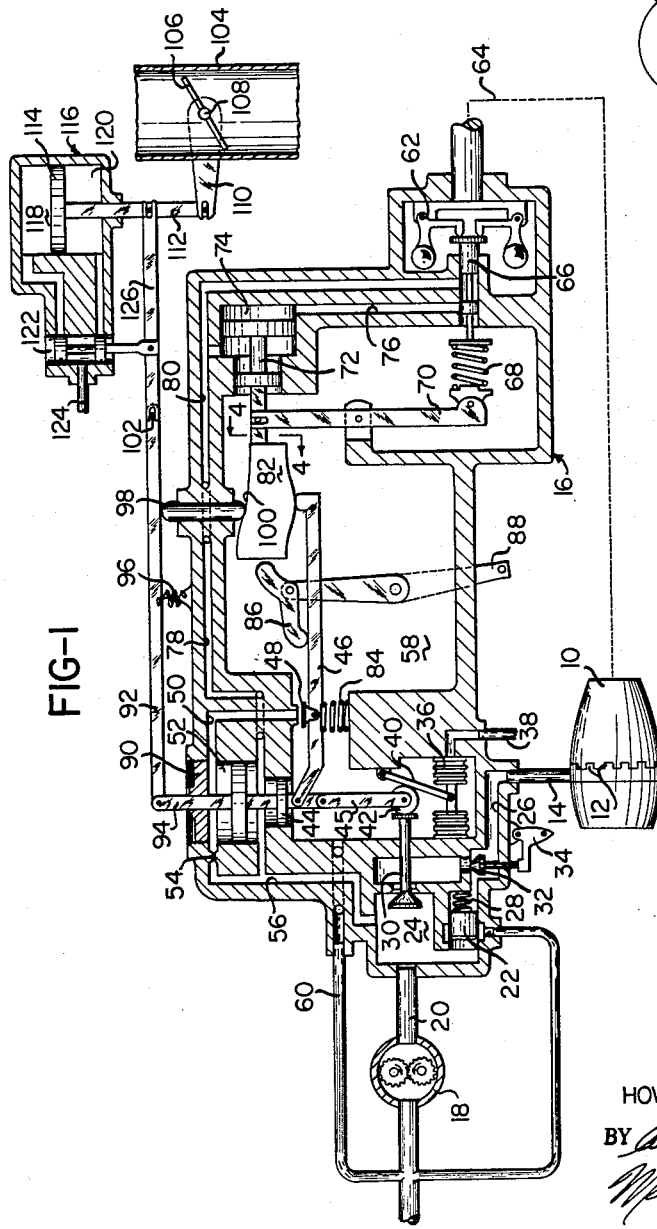
FIGURE 1 is a schematic drawing of an embodiment of my invention.

In the device shown in FIGURE 1, the parts are shown in the acceleration phase of operation. The engine 10 is supplied with fuel by means of a fuel manifold 12 connected to a fuel conduit 14 on the discharge side of the fuel control, shown generally at numeral 16. Fuel is supplied to the control 16 from a source, not shown, by means of a pump 18 and an inlet conduit 20. A conventional by-pass valve structure 22 senses the fuel control inlet pressure in chamber 24 and control outlet pressure in chamber 26, and by means of a calibrated spring 28 serves to maintain a constant pressure drop across the main metering valve 30 and shutoff valve 32. Valve 32 is normally fully open and is closed by an external lever 34 to shut off fuel flow to the engine 10. The main metering valve 30 is positioned first by a motion responsive to engine compressor discharge air pressure ($P_c$), or other suitable pressure, said pressure being applied to the interior of a pressure responsive bellows 36 through a passage 38 to produce a corresponding motion of the main metering valve 30 through the action of lever 40 and roller 42. The main metering valve 30 is positioned secondly by a servo piston 44 connected to roller 42 by link 45. As the servo piston 44 moves in an axial direction it carries with it a lever 46 to which is connected a servo valve member 48. Valve member 48 controls the release of fluid (in this case fuel) via passage 50 from a chamber 52 where this fluid pressure acts against the servo piston 44. When valve 48 is closed the pressure in chamber 52 increases to full supply fuel pressure obtained through orifice 54 and passage 56 so that the force unbalance on servo piston 44 drives the main metering valve 30 open. When valve 48 is open the pressure in chamber 52 decreases towards the low pressure in chamber 58 obtained from the fuel pump 18 inlet via passage 60 so that the servo piston 44 moves to close the main metering valve 30.

An intermediate "null" position of valve 48 is required to hold the intermediate pressure needed in chamber 52 to hold servo piston 44 and main metering valve 30 stationary. As such, it will be seen that the servo piston 44 and main metering valve 30 are hydraulically driven at a speed and in a direction determined by the departure of valve 48 from its null position. Lever 46, as connected to valve 48 and a servo piston 44, thus acts as a simple motion follower servo mechanism where the servo piston 44 reproduces the input motions applied to appropriate locations of lever 46. These appropriate input motions are generated by the basic speed governing and fuel flow limiting system as follows.

A conventional flyweight governor structure 62 is driven by the engine 10 through a linkage 64. The shoes of governor 62 act to move a spool valve 66 axially against spring 68 in response to changes in the speed of engine 10. A lever 70 pivoted against the fuel housing 16 transmits the motion of servo piston 72 to compress spring 68.

Servo piston 72 is hydraulically driven axially within fuel housing 16 by changes in the fluid pressure in chamber 74 created by changes in the position of spool valve 66. When the axial force of the flyweight structure 62 on valve 66 exceeds the force from spring 68, valve 66 is moved axially away from the flyweight structure 62 to open valve ports which permit high pressure fluid obtained from chamber 24 through passages 56, 78 and 80 to flow into chamber 74 through passage 76, thus causing servo piston 72 to move axially within the fuel housing 16 to increase the volume of chamber 74, which moves lever 70 to increase the compression of spring 68. This increased compression of spring 68 creates an additional force on valve 66 to overcome the initial unbalance force from the flyweight structure 62 which then moves the valve 66 to a "null" position where the force from spring 68 and flyweight structure 62 are in balance. When the axial force on valve 66 from the flyweight structure 62 is less than that from spring 68, then valve 66 is moved towards the flyweight structure 62 to open ports in valve 66 which release the fluid in chamber 74 to the low pressure in chamber 58 through passage 76, thus causing servo piston 72 to move axially within the fuel housing 16 to decrease the volume of chamber 74 which moves lever 70 to decrease the compression of spring 68. This decreased compression of spring 68 creates a reduction in force on valve 66 to rebalance the force from the flyweight structure 62 and valve 66 then moves to a "null" position. Thus servo piston 72 assumes a position for every speed of engine 10 which results in a compression of spring 68, so that the force from spring 68 balances the force from flyweight structure 62. Servo piston 72, in conjunction with lever 70, spring 68, valve 66, chamber 74 and passages 76, 80, 78, and 56, thus comprises a conventional speed measuring servo system wherein the axial position of the servo piston 72 in the fuel housing 16 is unique for each speed of engine 10. Cam 82 is attached to servo piston 72 and moves axially with changes in the speed of engine 10. Cam 82 is rotated by liquid-filled temperature-sensitive bellows 83 coupled to cam 82 by linkage 85, to provide unique positions in a rotary direction of cam 82 for each value of the temperature of the air entering the compressor of engine 10. Bellows 83 is located in housing 16 and air from the inlet of the compressor of engine 10 is caused to flow over the bellows 83.

Figure 3:
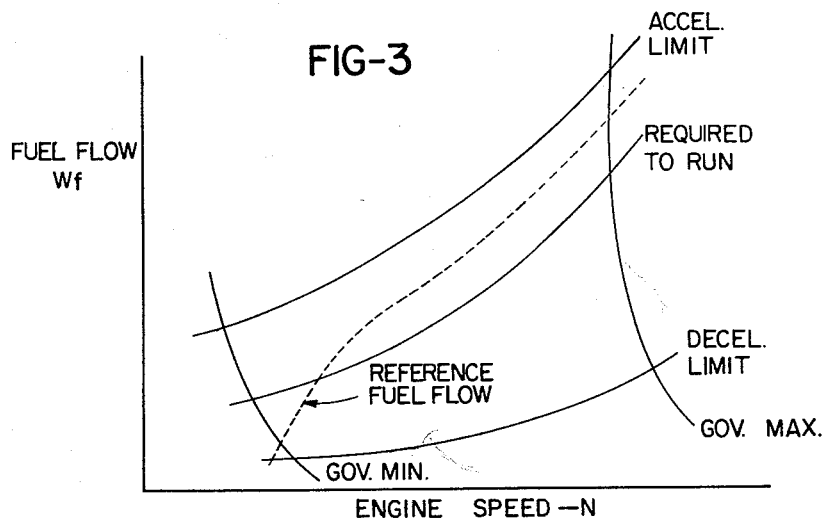
FIGURE 3 is a graph in which the weight rate of fuel flow $W_f$ is plotted against engine speed N to illustrate one form of the reference fuel flow line generated and utilized by the device of FIGURE 1.

Lever 46 is caused by spring 84 to follow one surface of cam 82 which then limits the motion of servo piston 44 in the direction of opening the main metering valve 30 to produce the acceleration limiting schedule shown in FIGURE 3. In the event engine speed exceeds the setting of the governor, cam 82 operates lever 86 against lever 46 to cause servo piston 44 to move in a direction which closes the main metering valve 30. The speed setting of the governor is determined by the position of the throttle lever 88 which is pinned to lever 86 so that a counterclockwise rotation of lever 88 produces an increased speed setting. A clockwise rotation of lever 88 produces a decreased speed setting. When the speed setting is decreased from maximum to minimum, lever 88 causes lever 86 to act against cam 82 and lever 46 so that valve member 48 is opened and servo piston 44 moves against stop 90 to set a minimum ratio of fuel flow to compressor discharge pressure ($W_f/P$) and thus produce the deceleration schedule shown in FIGURE 3.

All of the foregoing is a description of a conventional hydromechanical fuel control which provides selectable speed governing together with acceleration and deceleration limiting fuel schedules as shown in FIGURE 3. The following is a description of the variable geometry control feature which is integrated with the conventional fuel control.

Lever 92 is pinned to an extension shaft 94 drivably connected to servo piston 44. Tension spring 96 loads lever 92 against shaft 98 which is guided in the fuel housing 16 so as to bear against and follow a surface 100 on cam 82, said surface being a function of the speed (N) of engine 10 and the temperature of the inlet air to the compressor of engine 10 as a result of the motions applied to the cam by the mechanism described earlier. Lever 92 and the surface 100 of a cam 82 are so proportioned that pin 102 is stationary (at a null point) when the actual fuel flow, as established by the position of servo piston 44 (first movable control member), equals the reference fuel flow, as established by the position of shaft 98 (second movable control member) on the surface 100 of cam 82. The reference fuel flow is shown in FIGURE 3. When servo piston 44 moves to increase the actual fuel flow above the reference fuel flow, pin 102 (a part of the linkage) is caused by lever 92 and shaft 94 (other linkage parts) to move away from the null point in a direction away from fuel housing 16. Similarly, when actual fuel flow decreases below the reference fuel flow, pin 102 is moved away from the null point towards fuel housing 16. The position of pin 102 is thus an indication whether actual fuel flow is greater or less than the reference fuel flow.

The position of pin 102 is applied as an input to a positioning servomechanism to position a valve which bleeds air from the compressor of engine 10 as follows:

A conduit 104 is interposed between the compressor interstage air pressure of engine 10 and a region of lower pressure, such as atmospheric pressure. Conduit 104 is provided with a valve consisting of valve plate 106 affixed to shaft 108, rotatable inside of conduit 106 by the action of external lever 110 affixed to shaft 108. This air bleed valve, made up of parts 104, 106, 108, 110, is illustrative of variable engine geometry components which might be employed.

Rotation of shaft 108 causes plate 106 to effectively close off the flow of air through conduit 104 or to permit airflow through said conduit depending on the position of valve plate 106 as established by the position of lever 110. Lever 110 is pinned to shaft 112 which is drivably connected to servo piston 114 slidable in housing 116, said housing being maintained in a fixed position in relation to fuel housing 16 and conduit 104 by the use of intermediate structure (not shown). Servo piston 114 is acted on by the fluid pressures existing in chambers 118 and 120, said pressures being derived from a conventional spool type servo valve 122 slidable in housing 116 and supplied with a source of high pressure fluid (in this case air from the compressor of engine 10) through conduit 124. Servo valve 122 is drivably connected to lever 126 which is also connected to pin 102 and shaft 112.

In operation, a motion of pin 102 towards fuel housing 16 displaces lever 126 and servo valve 122 towards fuel housing 16. High pressure fluid from conduit 124 is admitted to chamber 120. The fluid in chamber 118 is relieved to a region of low pressure (in this case the surrounding atmosphere). The forces produced on servo piston 114 cause said piston to move to decrease the volume of chamber 118. Shaft 112, attached to piston 114, displaces lever 126 to restore servo valve 122 to a null position. When pin 102 is moved away from fuel housing 16, lever 126 and servo valve 122 are displaced away from fuel housing 16. High pressure fluid from conduit 124 is admitted to chamber 118. The fluid in chamber 120 is relieved to a region of low pressure. The forces produced on servo piston 114 cause said piston to move to increase the volume of chamber 118. Shaft 112, attached to piston 114, displaces lever 126 to restore servo valve 122 to a null position. Thus the motion of pin 102 is transmitted by the servo mechanism consisting of items 112, 114, 116, 118, 120, 122, 124, 126 to lever 110 to position the variable geometry component in this case, the air bleed valve consisting of items 104, 106, 108, 110. The mechanism is arranged so that the air bleed valve starts to open when the actual fuel flow equals the reference fuel flow as shown in FIGURE 3. As the actual fuel flow exceeds the reference fuel flow, the air bleed valve is opened further and in proportion to the degree of excess of actual fuel flow above the reference fuel flow.

It thus appears that the variable geometry component, here the air bleed valve, is rendered in a region of control, i.e., valve open position during the time that the actual fuel flow is greater than the reference fuel flow, and is in another region of control, i.e., bleed valve closed when actual fuel flow is less than reference fuel flow. Such control positions the variable geometry component for optimum compressor surge, or stall, characteristics when needed, i.e., when actual fuel flow increases above the reference, but assures that such special compressor air bleed conditions are not in operation when such condition would be detrimental to optimum engine fuel consumption or power, such as would be the case when actual fuel flow is less than reference fuel flow, and in this case the air bleed valve is closed.

Figure 2:
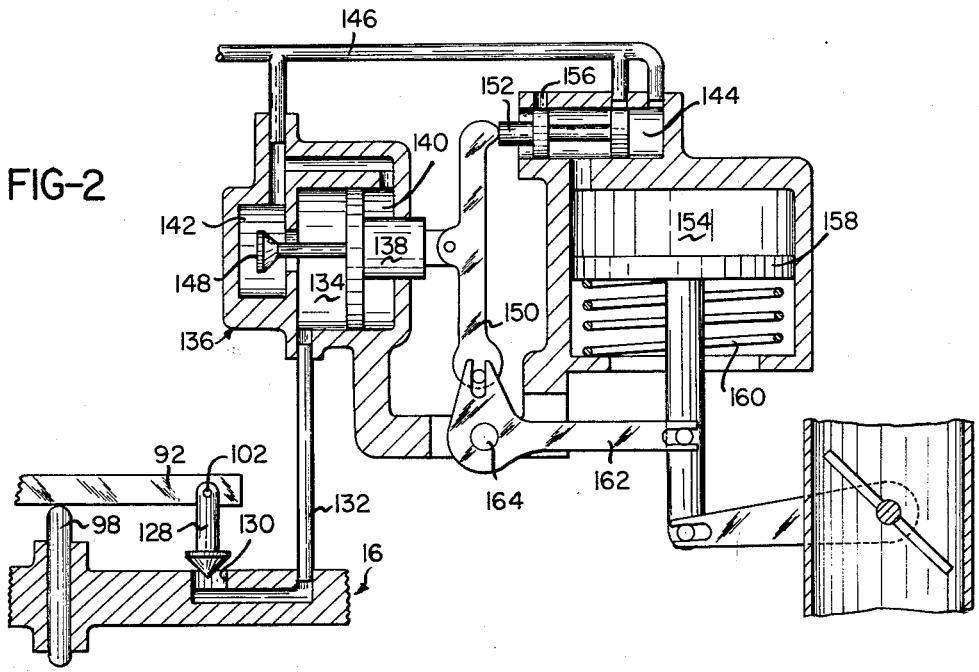
FIGURE 2 is a schematic drawing of an embodiment of my invention utilizing an alternate amplifier for positioning the variable geometry.

A modified form of the invention is shown in FIGURE 2 which discloses an alternate mechanism for transmitting the motion from control member pin 102 to the air bleed valve (variable geometry component) as shown in FIGURE 2. Pin 102 is connected to a contoured poppet actuator control valve 128 which seats against a hole 130 on fuel housing 16. Hole 130 is connected by conduit 132 to a chamber 134 in relay valve housing 136. Servo piston 138 moves axially within housing 136 in response to the pressures in chambers 134 and 140. High pressure fluid (in this case air from the compressor of engine 10) is applied to chambers 140, 142 and 134 through conduit 146. A contoured follow-up valve 148 drivably connected to servo piston 138 is interposed between chambers 134 and 142. As actuator control valve 128 is opened, the fluid pressure in piston chamber 134 decreases and servo piston 138 is moved by the force unbalance created by the pressures in chambers 134 and 140. Servo piston 138 is moved to open follow-up valve 148 which admits more fluid from chamber 142 into chamber 134 and thus increases the pressure in chamber 134. When the pressure in chamber 134 is restored to a value sufficient to maintain a force balance on servo piston 138, the motion of piston 138 ceases. When valve 128 is closed the fluid pressure in chamber 134 increases and servo piston 138 is moved by the force unbalance created by the pressures in chambers 134 and 140. Servo piston 138 is moved to close follow-up valve 148 which admits less fluid from chamber 142 into chamber 134 and thus decreases the pressure in chamber 134. When the pressure in chamber 134 is restored to a value sufficient to maintain a force balance on servo piston 138 the motion of piston 138 ceases. Thus for each opening of input valve 128 there is a corresponding opening of valve 148 and thus a position of servo piston 138.

The pin 102, the control member which reflects deviation of actual fuel flow above or below reference fuel flow, and its associated actuator control valve 128 are all carried in the main fuel control housing 16. It is, however, the intention that the entire relay valve unit 136 will be adjacent the variable geometry component to be actuated and therefore it is only necessary to increase the length of the fluid pressure conduit 132 to allow a remote positioning of variable geometry component as is often a requirement. It is thus apparent that the normally used mechanical linkage which stabilizes a servo piston movement, normally called a feedback linkage, might be difficult to accomplish, and in some cases impossible, for some locations of the variable geometry components. However, the mere extension in length or form of the conduit 132 might satisfactorily solve the problem. It therefore becomes an important feature of the remote actuation that the so-called follow-up valve 148 which stabilizes the pressure against the piston 138, as above described, accomplishes what might be termed a pressure actuated feedback result. The follow-up valve 148 connected to the piston 138 might thus be termed a follow-up feedback valve 148 and such nomenclature is contemplated.

Servo piston 138 is connected to lever 150 which bears against servo valve 152. Valve 152 is pushed against lever 150 by the action of high pressure fluid in chamber 144. Valve 152 varies the fluid pressure in chamber 154 by admitting either high pressure from conduit 146 or low pressure (in this case atmospheric presure) from conduit 156. The pressure in chamber 154 acts on servo piston 158, the motion of said servo piston being resisted by the force from spring 160. Servo piston 158 is connected to lever 162 pivoted in housing 136 about a pin 164. Lever 162 is connected to lever 150. As servo piston 138 moves to the right (decreasing opening of valve 148) valve 152 admits high pressure fluid to chamber 154 causing servo piston 158 to move downwards against spring 160. The motion of servo piston 158 is transferred by lever 162 to lever 150 and the resulting motion of lever 150 moves valve 152 to shut off the high pressure fluid admitted to chamber 154 and thus return valve 152 to a null position. An initial motion of servo piston 138 to the left causes a reverse action to occur. Thus each position of servo piston 138 produces a corresponding position of servo piston 158. Since, as described earlier, the position of servo piston 138 is determined by the position of valve 128 it follows that the position of servo piston 158 corresponds to a position of valve 128.

Servo piston 158 is connected to an engine compressor air bleed valve similar to that described for items 104, 106, 108, and 110 (an illustrative variable engine geometry component). Thus the device shown in FIGURE 2 produces a position for the engine compressor air bleed valve, items 104 through 110, which corresponds to the position of valve 128 and pin 102. Since, as described earlier, the position of pin 102 is determined by whether actual engine fuel flow is greater or less than the reference fuel flow shown in FIGURE 3, the compressor air bleed valve (variable geometry component) is partially open when actual fuel flow is greater than the reference fuel flow and is closed when actual fuel flow is less than the reference value.

From the above, it can be seen that for all operation of engine 10 where actual fuel flow is above the reference fuel flow, the compressor air bleed (or other variable geometry component) is positioned for optimum compressor surge or stall characteristics, and that for all operation when actual fuel flow is less than the reference fuel flow, the compressor air bleed (or other variable geometry) is positioned for optimum engine fuel consumption and power.

As heretofore set forth herein, the term "actual," as used in the designations "actual fuel flow" or "variation in actual fuel flow," is understood to distinguish between variation in the flow of fuel to the engine as represented by positioning of the member 94 for comparison with the reference fuel flow as set up on cam 82 to position the member 98. However, in designating the movement of the member 94 (first movable control member) as an indication of variation in fuel flow, it should be considered for the purpose of more specific definition that the positioning of the so-called first control member 94, as a representation of fuel flow for comparison purposes, is properly defined as "the main control parameter which determines fuel flow." Such definition gives consideration to the fact that the position and movement of the member 94 is an indicator of fuel flow which may include the effect of modifying mechanisms affected by variations in such engine operating parameters as speed, air temperature, or pressure, by way of example.

Although only one embodiment, plus the modified form of FIGURE 2, is shown and described herein, modifications may be made to suit the requirements of individual applications, within the scope of the following claims.

I claim:

1. In a variable geometry control for gas turbine engines having at least one variable geometry component, the actuation of which will vary engine performance:
 a first movable control member responsive in movement to the main control parameter which determines fuel flow to said engine;
 a second movable control member;
 a cam surface positioned to contact said second control member and formed to generate movements of said second control member over the operating range of said engine reflecting a predetermined desired variation of a reference fuel flow;
 connecting elements responsive to at least one parameter of engine operation for positioning said cam surface;
 a member responsive to differential movements of said first and second members comparing them to thereby produce a movement corresponding to a variation of said main control parameter determining fuel flow greater or less than said reference fuel flow;
 and connections from said differential responsive member to at least said one variable geometry component;
 said connections formed and positioned to actuate said variable geometry component in one region of control when said main control parameter determining fuel flow is greater than reference fuel flow and in another region of control when said main control parameter determining fuel flow is less than reference fuel flow.

2. In a variable geometry control for gas turbine engines having at least one variable geometry component, the actuation of which will vary engine performance:
 a first movable control member responsive to the main control parameter which determines fuel flow;
 a second movable control member;
 a member responsive in movement to at least one parameter of engine operation over the operating range of said engine;
 programming means actuated by said engine operation parameter responsive member positioning said second movable member in predetermined reference positions corresponding to predetermined desired variation of a reference fuel flow over a range of engine rotative speeds;
 a connecting linkage positioned by cooperative movement of said first and second control member and displacing a section of said linkage in one direction from a null point when said main control parameter determining fuel flow is greater than said reference fuel flow and displacing said linkage section in the opposite direction from said null point when said main control parameter determining fuel flow is less than said reference fuel flow;
 and connections from said linkage section to at least said one variable geometry component thereby to vary engine geometry in response to said directional movements of said linkage section.

3. In a variable geometry control for gas turbine engines having at least one variable geometry component, the actuation of which will vary engine performance:
 a fuel metering valve, the variation in the opening of which varies fuel flow to operate the engine;
 a first movable control member responsive in movement to the amount of the opening of said fuel metering valve and also responsive to variation in the main control parameter which determines fuel flow to operate said engine;
 a second movable control member responsive in movement to a predetermined programmed variation of a reference fuel flow over a range of operation of said engine;
 a member responsive to differential movement of said first and second members thereby to produce a movement corresponding to a variation of the main control parameter which determines fuel flow greater or less than said reference fuel flow;
 and connections from said differential responsive member to at least said one variable geometry component and further mechanism positioning said variable geometry component in one region of control when the main control parameter which determines fuel flow is greater than reference fuel flow and in another region of control when the main control parameter which determines fuel flow is less than reference fuel flow.

4. In a variable geometry control for gas turbine engines having at least one variable geometry component, the actuation of which will vary engine performance:
 a first movable control member responsive in movement to variation in the main control parameter which determines fuel flow to operate said engine;
 a second movable control member responsive in movement to predetermined programmed variation of a reference fuel flow over a range of operation of said engine;
 a member responsive to differential movements of said first and second members thereby to produce a movement corresponding to a variation of the main control parameter which determines fuel flow from said reference fuel flow;
 and connections from said differential movement responsive member to at least said one variable geometry component thereby to vary actuation of said variable geometry component.

5. Mechanism as in claim 4 in which said second movable control member reflects a variation in said programmed reference fuel flow as varied by elements imposing the effect of variations in engine rotative speed, an engine temperature, and an engine pressure.

6. Mechanism as in claim 4 in which movement of said second movable control member, representing reference fuel flow, is generated by elements movable in response to an engine rotative speed and an engine temperature.

7. Mechanism as in claim 4 in which movement of said second movable control member, representing reference fuel flow, is generated by elements movable in response to values of at least two parameters of engine operation.

8. Mechanism as in claim 4 in which movement of said second movable control member, representing reference fuel flow, is generated by elements movable in response to an engine rotative speed and an engine pressure.

9. Mechanism as in claim 4 in which movement of said second movable control member, representing reference fuel flow, is generated by elements movable in response to an engine pressure and an engine temperature.

10. In a variable geometry control for gas turbine engines having at least one variable geometry component the actuation of which will vary engine performance:
- a first control means indicative of variation in the main control parameter which determines fuel flow to operate said engine;
- a second control means indicative of a predetermined variation of a reference fuel flow over a range of operation of said engine;
- mechanism in combination with said first and second control means comparing them and thereby responsive to and indicative of the difference between said main control parameter which determines fuel flow and said reference fuel flow;
- and connections from said difference responsive mechanism to at least said one variable geometry component thereby to vary actuation of said variable geometry component as a function of said difference.

11. Mechanism as in claim 10 in which actuation of said second control means, representing reference fuel flow, is generated in response to values of at least one parameter of engine operation.

References Cited in the file of this patent

UNITED STATES PATENTS

| | | |
|---|---|---|
| 2,106,684 | Ring | Jan. 25, 1938 |
| 2,659,349 | Starkey | Nov. 17, 1953 |
| 2,688,844 | McLeod | Sept. 14, 1954 |
| 2,949,735 | Stefucza | Aug. 23, 1960 |
| 2,966,140 | Dungan | Dec. 27, 1960 |
| 3,006,145 | Sobey | Oct. 31, 1961 |
| 3,025,670 | Russ | Mar. 20, 1962 |
| 3,034,583 | Best | May 15, 1962 |
| 3,084,510 | Marscher | Apr. 9, 1963 |

FOREIGN PATENTS

| | | |
|---|---|---|
| 643,662 | Canada | June 26, 1962 |
| 1,219,946 | France | May 20, 1960 |
| 757,981 | Great Britain | Sept. 26, 1956 |
| 842,451 | Great Britain | July 27, 1960 |